(12) United States Patent
Asahina et al.

(10) Patent No.: US 8,148,488 B2
(45) Date of Patent: Apr. 3, 2012

(54) (BLOCK) POLYISOCYANATE COMPOSITION AND COATING COMPOSITION USING SAME

(75) Inventors: Yoshiyuki Asahina, Yokohama (JP); Masakazu Yamauchi, Yokohama (JP); Hironori Katagawa, Yokohama (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 1092 days.

(21) Appl. No.: 10/591,523

(22) PCT Filed: Mar. 1, 2005

(86) PCT No.: PCT/JP2005/003368
§ 371 (c)(1),
(2), (4) Date: Sep. 1, 2006

(87) PCT Pub. No.: WO2005/082966
PCT Pub. Date: Sep. 9, 2005

(65) Prior Publication Data
US 2007/0218209 A1   Sep. 20, 2007

(30) Foreign Application Priority Data

Mar. 1, 2004  (JP) ................. 2004-056425
Mar. 1, 2004  (JP) ................. 2004-056426

(51) Int. Cl.
C08G 18/32  (2006.01)
C08G 18/73  (2006.01)
C08G 18/75  (2006.01)
C08G 18/79  (2006.01)
C08G 18/80  (2006.01)

(52) U.S. Cl. ......... 528/45; 252/182.2; 528/59; 528/65; 528/66; 528/67; 528/73; 528/85; 528/80; 544/193; 544/222; 560/115; 560/158; 560/330; 564/44; 564/45

(58) Field of Classification Search ............... 252/182.2; 528/45, 59, 65, 66, 67, 73, 76, 80, 85; 544/193, 544/222; 560/115, 158, 330; 564/44, 45
See application file for complete search history.

(56) References Cited

U.S. PATENT DOCUMENTS

| 4,345,057 | A |   | 8/1982  | Yamabe et al. |
| 4,419,513 | A |   | 12/1983 | Breidenbach et al. |
| 4,810,820 | A | * | 3/1989  | Slack et al. ............ 560/27 |
| 5,137,972 | A |   | 8/1992  | Cook |
| 5,143,994 | A |   | 9/1992  | Laas et al. |
| 5,258,482 | A |   | 11/1993 | Jacobs et al. |
| 5,614,605 | A | * | 3/1997  | Mafoti et al. ............ 528/44 |
| 5,789,519 | A | * | 8/1998  | Slack et al. ............ 528/49 |
| 5,817,732 | A |   | 10/1998 | Asahina et al. |
| 6,111,048 | A | * | 8/2000  | Asahina et al. ............ 528/45 |
| 6,420,508 | B1 | * | 7/2002  | Danielmeier et al. ......... 528/49 |
| 6,469,122 | B1 | * | 10/2002 | Asahina et al. ............ 528/59 |
| 7,038,003 | B2 | * | 5/2006  | Mager et al. ............ 528/60 |
| 2003/0096909 | A1 | * | 5/2003 | Bernard et al. ............ 525/123 |

FOREIGN PATENT DOCUMENTS

| EP | 0 180 962     | 5/1986 |
| EP | 0 478 990 A1  | 4/1992 |
| JP | 4-71908       | 11/1992 |
| JP | 6-172474      | 6/1994 |
| JP | 8-245544      | 9/1996 |
| JP | 8-325351      | 12/1996 |
| JP | 8-325353      | 12/1996 |
| JP | 9-12660       | 1/1997 |
| JP | 11-140158     | 5/1999 |
| JP | 11-279484     | 10/1999 |
| JP | 2002-293873   | 10/2002 |
| WO | WO 02/32979   | 4/2002 |

* cited by examiner

*Primary Examiner* — Rabon Sergent
(74) *Attorney, Agent, or Firm* — Finnegan, Henderson, Farabow, Garrett & Dunner, L.L.P.

(57) ABSTRACT

Disclosed is a polyisocyanate composition which is excellent in both curability and drying characteristic. The polyisocyanate composition contains at least one compound selected from aliphatic diisocyanates, at least one compound selected from alicyclic diisocyanates and at least one compound selected from polyols, while satisfying all of the following conditions; i) the diisocyanate monomer concentration is not more than 3 mass %, ii) the polyol component concentration is 1-50 mass %; and iii) the glass transition temperature is from −50° C. to 0° C.

11 Claims, No Drawings

(BLOCK) POLYISOCYANATE COMPOSITION AND COATING COMPOSITION USING SAME

TECHNICAL FIELD

The present invention relates to a urethane coating composition using as a curing agent a (block) polyisocyanate composition excellent in curability, drying property and weathering resistance.

BACKGROUND ART

Urethane coating compositions using a polyisocyanate as a curing agent are excellent in chemical resistance and flexibility of the resulting coating film. Particularly, when polyisocyanates obtained from aliphatic or alicyclic diisocyanates are used as the curing agent, the coating film is excellent also in weathering resistance. Therefore, these polyisocyanates are used in cold- or heat-curing two-pack urethane coating compositions or heat-curing one-component urethane coating compositions in a wide variety of the fields such as constructions, heavy-duty anticorrosion, automobiles, industries and repairing.

Particularly, polyisocyanates obtained from hexamethylene diisocyanate (hereinafter referred to as "HDI") which is an aliphatic diisocyanate and isophorone diisocyanate (hereinafter referred to as "IPDI") which is an alicyclic diisocyanate are used widely because they are industrially easily available and the coating films obtained using them are excellent in weathering resistance, and HDI and IPDI have characteristics different from each other. Since HDI has two primary isocyanate groups, it is high in reactivity, and since HDI has six methylene groups between the isocyanate groups, the coating film obtained from coating compositions containing it is excellent in flexibility, while it is sometimes difficult to attain high hardness of the coating film. On the other hand, IPDI has two isocyanate groups which are primary and secondary isocyanate groups, and it is sometimes difficult to attain high reactivity, but since it has a cyclic structure between the isocyanate groups, the coating compositions containing IPDI are excellent in drying property and the resulting coating film is high in hardness.

There are earnestly desired those polyisocyanates which have both the advantages of reactivity of HDI and drying property of coating compositions containing IPDI. Some proposals have been made thereon. Patent Document 1 and Patent Document 2 disclose polyisocyanate compositions comprising a mixture of HDI prepolymer and IPDI prepolymer. According to the technologies disclosed, it is difficult to overcome the low reactivity of the IPDI prepolymer because the respective isocyanate prepolymers are present independently in the composition.

Biuret bond-containing polyisocyanates obtained from HDI and IPDI are disclosed in Patent Document 3, isocyanurate bond-containing polyisocyanates obtained from HDI and IPDI are disclosed in Patent Document 4, and isocyanurate bond-containing polyisocyanates obtained from HDI and IPDI modified with a monoalcohol are disclosed in Patent Document 5. These are all technologies relating to polyisocyanates in which HDI and IPDI are both incorporated into the molecules, and consequently the number of primary isocyanate groups having high reactivity per one molecule of the polyisocyanates decreases, and sometimes the reactivity (curability) is deteriorated.

On the other hand, Patent Document 6 discloses a polyisocyanate which is large in average number of isocyanate group (the statistical average number of isocyanate group in one molecule) and which is derived from HDI and a polyol. The crosslinkability of the polyisocyanate has been enhanced, but high drying property has been further required.

Patent Document 1: U.S. Pat. No. 5,137,972
Patent Document 2: JP-A-2002-293873
Patent Document 3: JP-B-4-71908
Patent Document 4: U.S. Pat. No. 4,419,513
Patent Document 5: U.S. Pat. No. 5,258,482
Patent Document 6: U.S. Pat. No. 5,817,732

DISCLOSURE OF INVENTION

An object of the present invention is to provide a (block) polyisocyanate composition excellent in both curability and drying property, a method for producing the same, and a coating composition containing the same and capable of attaining high hardness of coating film.

As a result of intensive research conducted by the inventors, it has been found that the above object can be attained by a (block) polyisocyanate composition which is derived from an aliphatic diisocyanate, an alicyclic diisocyanate and a polyol in a specific proportion and has specific values of physical properties. Thus, the present invention has been accomplished.

That is, the construction of the present invention is as follows.

(1) A polyisocyanate composition which is represented by the following structural formula (I) and satisfies all of the requirements: i) the diisocyanate monomer concentration being not more than 3 mass %, ii) the polyol component concentration being 1-50 mass %, and iii) the glass transition temperature being −50° C. to 0° C.;

$$R-(NCO)_n \qquad (I)$$

(in the formula, R is a residue excluding isocyanate group in the polyisocyanate composition derived from at least one compound selected from the group of aliphatic diisocyanates; at least one compound selected from the group of alicyclic diisocyanates and at least one compound selected from the group of polyols, the diisocyanate and the polyol are bonded through an allophanate bond in at least a part of bonding portions of the diisocyanate and the polyol, the ratio of aliphatic diisocyanate component/alicyclic diisocyanate component is 95/5-50/50 (by mass ratio), and n (a statistical average number of isocyanate group in one molecule of the polyisocyanate) is 4.5-20).

(2) The polyisocyanate composition described in the above (1) which has a viscosity of 100,000-2,000,000 mPa·s/25° C.

(3) The polyisocyanate composition described in the above (1) or (2), wherein the average number of hydroxyl group per one molecule of polyol is 3-8.

(4) The polyisocyanate composition described in any one of the above (1)-(3), wherein the glass transition temperature is −45° C. to −10° C.

(5) The polyisocyanate composition described in any one of the above (1)-(4) which contains an isocyanurate bond.

(6) The polyisocyanate composition described in any one of the above (1)-(5), wherein the polyol has a number average molecular weight of 500 or less.

(7) The block polyisocyanate composition comprising the polyisocyanate composition described in any one of the above (1)-(6) in which a part or the whole of the isocyanate group is blocked with a blocking agent.

(8) A method for producing the polyisocyanate composition described in any one of the above (1)-(6) which comprises the steps of: reacting at least one compound selected from the group of aliphatic diisocyanates, at least one compound selected from the group of alicyclic diisocyanates and at least one compound selected from the group of polyols at a ratio of isocyanate group/hydroxyl group (equivalent ratio) =3/1-30/1; optionally carrying out isocyanuration reaction after or simultaneously with the above reaction; and then removing unreacted diisocyanate monomers.

(9) A coating composition which comprises the polyisocyanate composition or block polyisocyanate composition described in any one of the above (1)-(7) and at least one polyol.

(10) The coating composition described in the above (9) which is used for clear coat.

(11) A method for applying the coating composition described in the above (10) which comprises applying the coating composition to a base coat containing a pigment.

(12) The application method described in the above (11), wherein the base coat is a water-based paint.

(13) The application method described in the above (11) or (12) which further comprises simultaneously curing the base coat and the clear coat.

The term "polyisocyanate composition" in this specification means a mixture of many kinds of polyisocyanate molecules (an aggregate of molecules formed with having various bonding types and polymerization degrees) which is represented by the above structural formula (I) as a whole of the composition.

BEST MODE FOR CARRYING OUT THE INVENTION

The aliphatic diisocyanates usable in the present invention are preferably those which have 4-30 carbon atoms, and include, but are not limited to, for example, tetramethylene-1,4-diisocyanate, pentamethylene-1,5-diisocyanate, HDI, 2,2,4-trimethylhexamethylene-1,6-diisocyanate and lysine diisocyanate. Among them, HDI is preferred from the point of easiness in weatherability and industrial availability.

The alicyclic diisocyanates used in the present invention are preferably those which have 8-30 carbon atoms, and include, but are not limited to, for example, IPDI, 1,3-bis (isocyanate methyl)-cyclohexane and 4,4'-dicyclohexylmethane diisocyanate. Among them, IPDI is preferred from the point of weatherability and easiness in industrial availability.

The mass proportion of the aliphatic diisocyanate component and the alicyclic diisocyanate component in the polyisocyanate composition of the present invention is 95/5-50/50, preferably 90/10-60/40. If the proportion of the aliphatic diisocyanate component exceeds 95/5, the hardness of coating film obtained from a coating composition containing the polyisocyanate composition sometimes lowers. On the other hand, if the proportion of the alicyclic diisocyanate component exceeds 50/50, the polyisocyanate composition becomes cloudy and the coating film obtained from a coating composition containing the polyisocyanate composition sometimes deteriorates in flexibility.

The polyols constituting the polyisocyanate composition of the present invention include compounds having two or more hydroxyl groups in one molecule, for example, from dihydric alcohols to octahydric alcohols.

Examples of the dihydric alcohols are ethylene glycol, diethylene glycol, triethylene glycol, propylene glycol, dipropylene glycol, tripropylene glycol, 1,2-propanediol, 1,3-propanediol, 1,2-butanediol, 1,3-butanediol, 1,4-butanediol, 2,3-butanediol, 2-methyl-1,2-propanediol, 1,5-pentanediol, 2-methyl-2,3-butanediol, 1,6-hexanediol, 1,2-hexanediol, 2,5-hexanediol, 2-methyl-2,4-pentanediol, 2,3-dimethyl-2,3-butanediol, 2-ethyl-hexanediol, 1,2-octanediol, 1,2-decanediol, 2,2,4-trimethylpentanediol, 2-butyl-2-ethyl-1,3-propanediol, 2,2-diethyl-1,3-propanediol, etc. Examples of the trihydric alcohols are glycerin, trimethylolpropane, etc. Examples of the tetrahydric alcohols are diglycerin, ditrimethylolpropane, pentaerythritol, dipentaerythritol, D-threitol, etc. Examples of the pentahydric alcohols are L-arabinitol, ribitol, xylitol, L-rhamnitol, etc. Examples of hexahydric alcohols are D-glucitol, D-mannitol, galactitol, etc. Examples of heptahydric alcohols are trehalol, etc. Examples of octahydric alcohols are sucrose, maltose, gentiobiose, lactose, melibiose, etc. Furthermore, adducts of these polyols with ε-caprolactone, or the like can also be used.

The average number of hydroxyl group per one molecule of the polyol used in the present invention is preferably 3-8, more preferably 3-5. If the average number of hydroxyl group of the polyol is less than 3, the lower limit (4.5) of the average number n of isocyanate group required for the polyisocyanate composition of the present invention (a statistical average number of isocyanate group in one molecule of polyisocyanate which is obtained from (number average molecular weight of polyisocyanate)×(concentration of isocyanate group)/42) cannot sometimes be attained. On the other hand, if the average number of hydroxyl group of the polyol exceeds 8, the reactivity between hydroxyl group of polyol and isocyanate group of diisocynate lowers, which sometimes makes it difficult to produce the polyisocyanate composition of the present invention.

Furthermore, the number average molecular weight of the polyol used in the present invention is not more than 500, more preferably not more than 300. If it exceeds 500, the desired hardness of the coating film in the present invention cannot be attained in some cases.

The concentration of polyol component in the polyisocyanate composition of the present invention is 1-50 mass %, preferably 3-30 mass %, more preferably 3-15 mass %. If the concentration of polyol component is less than 1 mass %, the average number of isocyanate group of the polyisocyanate composition lowers in some cases. On the other hand, if the concentration of polyol component exceeds 50 mass %, the compatibility with polyol used in the coating composition sometimes lowers.

In the polyisocyanate composition of the present invention, it is preferred that the diisocyanate and the polyol are bonded through allophanate bond. The allophanate bond is shown below.

[Formula 1]

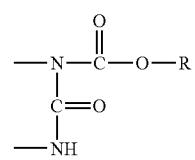

The allophanate bond is formed from isocyanate group of diisocyanate and hydroxyl group of polyol. A urethane bond can also be formed partially in place of the allophanate bond. The proportion of the allophanate bond and the urethane bond is 10:0 to 8:2, preferably 10:0 to 9:1, and further preferably the urethane bond is not present. If the urethane bond exceeds the proportion of 8:2, in some cases, the lower limit (4.5) of the average number n of isocyanate group required for the polyisocyanate composition of the present invention can hardly be attained. JP-A-6-172474 discloses an isocyanurate bond-containing polyisocyanate obtained from two different diisocyanates and a polyisocynate having urethane bond obtained from a diol. On the other hand, the present invention relates to a polyisocyanate composition having allophanate bond in which urethane bond is not present or only a small amount of urethane bond is present.

The average number n of isocyanate group in the polyisocyanate composition of the present invention is 4.5-20. If the average number n of isocyanate group is smaller than 4.5, curability of the coating composition containing the polyisocyanate composition is sometimes deteriorated, and if the average number n of isocyanate group exceeds 20, compatibility with polyol used in the coating composition is sometimes deteriorated.

The concentration of diisocyanate monomer present in the polyisocyanate composition of the present invention is not more than 3 mass %, preferably not more than 1 mass %, more preferably not more than 0.5 mass %. If the concentration of diisocyanate monomer exceeds 3 mass %, the curability sometimes deteriorates, and besides the dryability is deteriorated.

The viscosity of the polyisocyanate composition of the present invention measured by E-type viscometer is preferably 100,000-2,000,000 mPa·s/25° C., more preferably 150,000-1,500,000 mPa·s/25° C. If the viscosity of the polyisocyanate composition is lower than 100,000 mPa·s/25° C., the lower limit (4.5) of the average number n of isocyanate group cannot sometimes be attained. On the other hand, if the viscosity of the polyisocyanate composition exceeds 2,000,000 mPa·s/25° C., compatibility with polyol used in the coating composition is sometimes deteriorated.

The glass transition temperature (hereinafter referred to as "Tg") of the polyisocyanate composition of the present invention is −50° C. to 0° C., preferably −45° C. to −10° C. If Tg is lower than −50° C., the dryability of the coating composition containing the polyisocyanate composition is sometimes deteriorated. On the other hand, if Tg exceeds 0° C., the curability of the coating composition containing the polyisocyanate composition is sometimes deteriorated. The Tg is a temperature at which change of state occurs between glass state and liquid state. It is well known that Tg is a very important factor for the coating film which is a polymer. Since Tg of a polymer relates to freezing and releasing of segment movement, it is considered that Tg does not depend on the molecular weight of the polymer.

The inventors have paid their attention to Tg of the polyisocyanate composition which has not been noticed until now. When only HDI is used as a diisocyanate starting material for obtaining polyisocyanate composition, Tg of this polyisocyanate composition is affected by the molecular weight. However, Tg of the coating film crosslinked with the HDI is not affected by Tg of the polyisocyanate composition. Furthermore, when the polyisocyanate composition obtained using HDI as a starting material is mixed with the polyisocyanate composition obtained using IPDI as a starting material, Tg of the resulting mixture becomes higher. Tg of the coating film crosslinked with the mixture also becomes higher.

Tg of the polyisocyanate composition of the present invention is affected by the molecular weight and the proportion of IPDI used. It has been found that Tg of the coating film crosslinked with IPDI is surprisingly higher than Tg of the coating film obtained from the above mixed polyisocyanate composition having the same proportion of IPDI. It has been further found that when the specific range of Tg limited from the above viewpoint is employed as one of requirements of the polyisocyanate composition, the coating composition prepared using this polyisocyanate composition is excellent in both curability and dryability.

The polyisocyanate composition of the present invention preferably contains an isocyanurate group. The isocyanurate group has a structure comprising three isocyanate groups and is effective for improving dryability of the coating composition. Furthermore, in addition to the isocyanurate group, the polyisocyanate composition can contain biuret group, urea group, iminoxadiazinedione group, iminoxadiazinetrione group, urethodione group, carbodiimide group, amide group, acylurea group, imide group, and the like which are formed in relation with isocyanate group.

Furthermore, the polyisocyanate composition of the present invention is useful also as a block polyisocyanate composition comprising the polyisocyanate composition in which a part or all of the isocyanate groups are blocked with a blocking agent. The blocking agent used is a compound having one active hydrogen in the molecule, and as examples thereof, mention may be made of alcohols, alkylphenols, phenols, active methylenes, mercaptans, acid amides, acid imides, imidazoles, ureas, oximes, amines, imides, pyrazoles, etc.

More specific examples of the blocking agent are shown below.

(1) Alcohols; alcohols such as methanol, ethanol, 2-propanol, n-butanol, sec-butanol, 2-ethyl-1-hexanol, 2-methoxyethanol, 2-ethoxyethanol, and 2-butoxyethanol.

(2) Alkylphenols; mono- and di-alkylphenols having an alkyl group of 4 or more carbon atoms, for example, monoalkylphenols such as n-propylphenol, i-propylphenol, n-butylphenol, sec-butylphenol, t-butylphenol, n-hexylphenol, 2-ethylhexylphenol, n-octylphenol and n-nonylphenol, and dialkylphenols such as di-n-propylphenol, diisopropylphenol, isopropylcresol, di-n-butylphenol, di-t-butylphenol, di-sec-butylphenol, di-n-octylphenol, di-2-ethylhexylphenol and di-n-nonylphenol.

(3) Phenols; phenol, cresol, ethylphenol, styrenated phenols, hydroxybenzoic esters, etc.

(4) Active methylenes; dimethyl malonate, diethyl malonate, methyl acetoacetate, ethyl acetoacetate, acetylacetone, etc.

(5) Mercaptans; butyl mercaptan, dodecyl mercaptan, etc.

(6) Acid amides; acetanilide, acetamide, ε-caprolactam, δ-valerolactam, γ-butyrolactam, etc.

(7) Acid imides; succinimide, maleimide, etc.

(8) Imidazoles; imidazole, 2-methylimidazole, etc.

(9) Ureas; urea, thiourea, ethyleneurea, etc.

(10) Oximes; formaldehyde, acetaldoxime, acetoxime, methyl ethyl ketoxime, cyclohexanonoxime, etc.

(11) Amines; diphenylamine, aniline, carbazole, di-n-propylamine, diisopropylamine, isopropylethylamine, etc.

(12) Imines; ethyleneimine, polyethyleneimine, etc.

(13) Pyrazoles; pyrazole, 3-methylpyrazole, 3,5-dimethylpyrazole, etc.

Preferred blocking agents are at least one compound selected from alcohols, oximes, acid amides, active methylenes and pyrazoles, and two or more of them can be used in combination.

Next, a process for producing the polyisocyanate composition of the present invention will be explained below.

First, isocyanate groups of the aliphatic diisocyanate and the alicyclic diisocyanate are reacted with hydroxyl group of the polyol. The proportion of aliphatic diisocyanate component/alicyclic diisocyanate component (mass ratio) of the polyisocyanate composition of the present invention (namely, after the reaction) is higher than the proportion before the reaction. This is unexpected. The above Patent Document 4 (column 3, line 45 and the following) discloses that the proportion of aliphatic diisocyanate component and alicyclic diisocyanate component before the reaction coincides with the proportion in the polyisocyanate produced.

The equivalent ratio of the isocyanate group of these diisocyanates to the hydroxyl group of the polyol is 3/1-30/1, preferably 10/1-20/1. If the equivalent ratio is less than 3/1, the viscosity of the polyisocyanate composition of the present invention sometimes exceeds the upper limit of the preferred range of viscosity. On the other hand, if the equivalent ratio exceeds 30/1, productivity of the polyisocyanate composition is inferior.

The reaction temperature is 50-200° C., preferably 50-150° C. If it is lower than 50° C., the reaction hardly proceeds, and if it exceeds 200° C., there sometimes take place undesired side reactions to cause coloration of the resulting polyisocyanate composition. The reaction time is preferably in the range of 0.5-3 hours.

It is also preferred to carry out isocyanuration reaction after or simultaneously with the reaction of a part or all of hydroxyl groups of the polyol with isocyanate groups of the diisocyanates. If this isocyanuration reaction is not carried out, the hardness of the coating film obtained using the resulting polyisocyanate composition may lower in some cases. The isocyanuration reaction temperature is 50-200° C., preferably 50-150° C. If the reaction temperature is lower than 50° C., the reaction hardly proceeds, and if it exceeds 200° C., there sometimes take place undesired side reactions which may cause coloration of the resulting polyisocyanate composition.

As the isocyanuration catalysts used in this case, preferred are, for example, those which are basic. Examples of them are (i) hydroxides of tetraalkylammonium such as tetramethylammonium and tetraethylammonium, or organic weak acid salts of acetic acid, capric acid, etc., (ii) hydroxides of hydroxyalkylammonium such as trimethylhydroxypropylammonium, trimethylhydroxyethylammonium, triethylhydroxypropylammonium and triethylhydroxyethylammonium, or organic weak acid salts of acetic acid, capric acid, etc., (iii) alkali metal salts (tin, zinc, lead, etc.) of alkylcarboxylic acids such as acetic acid, caproic acid, octylic acid and myristic acid, (iv) metal alcoholates of sodium, potassium, etc., (v) aminosilyl group-containing compounds such as hexamethyldisilazane, (vi) Mannich bases, (vii) combination of tertiary amines with epoxy compounds, (viii) phosphorus compounds such as tributylphosphine, and the like. The ammonium salts are most preferred.

For termination of these reactions, the catalyst is deactivated. When the catalyst is deactivated by neutralization, acidic substances such as phosphoric acid and acid phosphoric esters are added, and furthermore the catalyst can also be deactivated by thermal decomposition or chemical decomposition.

The yield of the polyisocyanate composition (mass of the resulting polyisocyanate composition/total mass of charged starting materials×100) is selected from the range of 10-70 mass %, preferably 30-60 mass %.

The polyisocyanate composition of the present invention is derived by reacting aliphatic diisocyanate, alicyclic diisocyanate and polyol. It is preferred to carry out both the reaction of isocyanate group of the diisocyanates with hydroxyl group of the polyol and the isocyanuration reaction in combination.

Surprisingly, as a result of carrying out at least two different reactions using as starting materials at least two diisocyanates differing in structure and polyol, namely, allophanation reaction and additionally isocyanuration reaction as mentioned above, the resulting polyisocyanate composition is high in crosslinkability, and the coating film obtained from the coating composition containing the polyisocyanate composition as a curing agent is high in hardness and excellent in dryability.

After completion of the reactions, unreacted diisocyanate monomers are removed by a thin film evaporator, extraction or the like, and the polyisocyanate composition of the present invention contains substantially no unreacted diisocyanate monomers. The concentration of the unreacted diisocyanate monomers in the resulting polyisocyanate composition is 3 mass % or less, preferably 1 mass % or less, more preferably 0.5 mass % or less. If the concentration of the unreacted diisocyanate monomers exceeds 3 mass %, curability of the polyisocyanate composition is deteriorated in some cases.

According to the preferred process for producing the polyisocyanate composition of the present invention, after formation of urethane bond by the reaction of isocyanate group of the diisocyanates and hydroxyl group of the polyol, the allophanation reaction is carried out simultaneously with the isocyanuration reaction. These reactions can be carried out by selecting the isocyanuration reaction catalyst and the reaction conditions.

Next, the coating composition containing the polyisocyanate composition of the present invention will be explained.

The coating composition of the present invention can be prepared by mixing the polyisocyanate composition obtained as mentioned above with a compound containing in the molecule two or more active hydrogens having reactivity with isocyanate group. They react with each other and can form a crosslinked coating film.

As the compound containing two or more active hydrogens in the molecule, mention may be made of polyols, polyamines, polythiols, etc. These can also be used in combination of two or more. Polyol is preferred. Examples of the polyols are polyol mentioned above and besides acryl polyols, polyester polyols, polyether polyols, polyolefin polyols, epoxy polyols and fluorine polyols.

The acryl polyols include, for example, acrylic polyols which are obtained by polymerization using one or a mixture of the compounds which are selected from the group of acrylic esters having active hydrogen, such as 2-hydroxyethyl acrylate, 2-hydroxypropyl acrylate and 2-hydroxybutyl acrylate, and acrylic monoesters and methacrylic monoesters of glycerin, and acrylic monoesters and methacrylic monoesters of trimethylolpropane; and one or a mixture of the compounds which are selected from the group of acrylic esters such as methyl acrylate, ethyl acrylate, isopropyl acrylate, n-butyl acrylate and 2-ethylhexyl acrylate, methacrylic esters having active hydrogen, such as 2-hydroxyethyl methacrylate, 2-hydroxypropyl methacrylate, 2-hydroxybutyl methacrylate, 3-hydroxypropyl methacrylate and 4-hydroxybutyl methacrylate, and methacrylic esters such as methyl methacrylate, ethyl methacrylate, isopropyl methacrylate, n-butyl methacrylate, isobutyl methacrylate, n-hexyl methacrylate and lauryl methacrylate; in the presence or absence of one or a mixture of the compounds which are selected from the group of unsaturated carboxylic acids such as acrylic acid, methacrylic acid, maleic acid and itaconic acid, unsaturated amides such as acrylamide, N-methylolacrylamide and diacetoneacrylamide, and other polymerizable monomers such as glycidyl methacrylate, styrene, vinyltoluene, vinyl acetate, acrylonitrile and dibutyl fumarate.

The polyester polyols include, for example, polyester polyols obtained by condensation reaction of one or a mixture of dibasic acids which are selected from the group of carboxylic acids such as succinic acid, adipic acid, sebacic acid, dimeric acid, maleic anhydride, phthalic anhydride, isophthalic acid and terephthalic acid; with one or a mixture of polyhydric alcohols which are selected from the group of ethylene glycol, propylene glycol, diethylene glycol, neopentyl glycol, trimethylolpropane and glycerin. These polyester polyols can be modified with aromatic diisocyanates, aliphatic or alicyclic diisocyanates and polyisocyanates obtained from these diisocyanates. In this case, polyester polyols modified with aliphatic or alicyclic diisocyanates or polyisocyanates obtained from them are especially preferred from the points of weatherability and yellowing resistance.

The polyether polyols include, for example, polyether polyols obtained by random or block addition of one or a mixture of alkylene oxides such as ethylene oxide, propylene oxide, butylene oxide, cyclohexene oxide and styrene oxide to one or a mixture of polyols having a molecular weight of 500 or less using strongly basic catalysts such as hydroxides of lithium, sodium, potassium, alcoholates, alkylamines, etc., metal porphyrins, and composite metal cyan compound complexes such as zinc hexacyanocobaltate complex. The polyether polyols further include polyether polyols obtained by reacting polyamine compounds such as ethylenediamine with alkylene oxides, and so-called polymer polyols obtained by polymerizing acrylamide or the like using the above polyols as media.

The polyolefin polyols include, for example, polybutadienes having two or more hydroxyl groups, hydrogenated polybutadienes, polyisoprenes and hydrogenated polyisoprenes.

The epoxy polyols include, for example, novolak type, β-methylepichloro type, cyclic oxirane type, glycidyl ether type and glycol ether type epoxy polyols, and epoxy type, epoxylated fatty acid ester type, polyvalent carboxylic ester type, aminoglycidyl type, halogenated type and resorcin type of aliphatic unsaturated compounds, and these polyols modified with amino compounds, polyamide compounds, etc.

The fluorine polyols are polyols containing fluorine in the molecule, and include, for example, copolymers of fluoroolefin, cyclohexylvinyl ether, hydroxyalkylvinyl ether, monocarboxylic acid vinyl esters, etc. which are disclosed in U.S. Pat. No. 4,345,057 and EP 180962.

The hydroxyl value of the polyol used as a component of the coating composition is selected preferably from 30-200 mgKOH/g and the acid value thereof is selected preferably from 0-30 mgKOH/g. These polyols may be used in combination of two or more.

Preferred polyols are acrylic polyols and polyester polyols, and more preferred are acrylic polyols, and polyester polyols and non-aqueous dispersions (NAD) can be used in combination.

In preparing the coating composition using the polyisocyanate composition of the present invention, the equivalent ratio of isocyanate group of the polyisocyanate composition and hydroxyl group of the polyol is optionally selected from the range of preferably 1/2-2/1.

Furthermore, according to the use and object, the coating composition can contain various solvents, ultraviolet absorbers such as benzotriazole and benzophenone, light stabilizers such as hindered amines and hindered phenols, organic pigments such as quinacridone, Pigment Red and Phthalocyanine Blue, inorganic pigments such as titanium oxide and carbon black, metallic pigments such as aluminum powders, light interference pigments such as pearl mica powders, curing accelerators such as tin compounds, zinc compounds and amine compounds, and the like. The solvents can be optionally selected from the group of, for example, ketones such as acetone, methyl ethyl ketone and methyl isobutyl ketone, esters such as ethyl acetate, n-butyl acetate and cellosolve acetate, and alcohols such as butanol and isopropyl alcohol according to the object and use of the coating composition. These solvents can be used each alone or in combination of two or more.

The thus prepared coating compositions are useful in the fields of precoated metals such as anticorrosive steel plates, automobile finishing, etc. as primers or facing or intercoating agents for metals such as steel plates and surface-treated steel plates, plastics and inorganic materials which are coated by the coating means such as roll coating, curtain flow coating, spray coating, antistatic coating and bell coating.

Particularly, the coating composition is preferred also as a clear coating containing no pigment mentioned above since it is excellent in acid rain resistance and weatherability.

Furthermore, the coating composition can be coated on non-aqueous or aqueous base coat containing the above pigments, and the base coat and the clear coat can be simultaneously cured.

The present invention will be explained in more detail below by the following examples, which should not be construed as limiting the invention in any manner. The "parts" are all parts by mass.

First, methods for measurement of the physical properties will be explained.

(Measurement of Number Average Molecular Weight)

The number average molecular weight of polyisocyanate composition is one which is by polystyrene standard according to measurement by gel permeation chromatograph (hereinafter referred to as "GPC") using the following apparatus.

Apparatus: HLC-802A manufactured by Toso Co., Ltd.
Column: G1000HXL (one column)
G2000HXL (one column)
G3000HXL (one column)
The above columns are manufactured by Toso Co., Ltd.
Carrier: Tetrahydrofuran
Detection method: Differential refractometer (Yield)

Yield is calculated from the following formula.

Yield (%)=mass of the resulting polyisocyanate composition/total weight of charged starting materials×100

(Average Number of Isocyanate Group)

The average number of isocyanate group of the polyisocyanate composition is calculated from the following formula.

Average number of isocyanate group of polyisocyanate composition=number average molecular weight of polyisocyanate composition×concentration of isocyanate group/42

(Concentration of Isocyanate Group)

The concentration of isocyanate group in the polyisocyanate composition is obtained by adding n-dibutylamine to the polyisocyanate composition dissolved in toluene and carrying out potentiometric titration using 1N hydrochloric acid.

(Mass Ratio of HDI Component/IPDI Component)

Mass of unreacted HDI and mass of unreacted IPDI are calculated from mass of unreacted diisocyanate after reaction and concentrations of HDI and IPDI in the unreacted diisocyanate obtained by measurement with gas chromatograph. The ratio of difference between the mass of the charged HDI and the mass of the unreacted HDI to difference between the mass of the charged IPDI and the mass of the unreacted IPDI is the mass ratio in the polyisocyanate composition.

(Concentration of Unreacted Diisocyanate Monomer)

The peak area % corresponding to the molecular weight of unreacted diisocyanate obtained by the above-mentioned GPC measurement (e.g., 168 in the case of HDI) is expressed as mass concentration of the unreacted diisocyanate monomer in the polyisocyanate composition.

(Measurement of Viscosity)

The viscosity of the polyisocyanate composition is measured using an E-type viscometer (RE-80U manufactured by Toki Sangyo Co., Ltd.) with a cone-plate of 3 degree and R12, and at a number of revolution of 2.5 rpm, and at 25° C. (unit: mPa·s/25° C.).

(Presence or absence of allophanate Bond, isocyanurate bond, urethane Bond)

Proton nuclear magnetic resonance spectrum is measured using FT-NMR DPX-400 manufactured by Bruker Co., Ltd. at a concentration of sample (polyisocyanate composition) of 5 mass %, 400 MHz and an integrated number of 256 times using heavy chloroform $CDCl_3$ as a solvent to determine the presence or absence of allophanate bond, isocyanurate bond, urethane bond. Based on all the protons of β position and γ position originated from HDI, in the case of isocyanurate bond, when the proportion of all the protons of methylene group originated from HDI and adjacent to isocyanurate bond are 1% or more, the bond is judged to be present and when they are less than 1%, the bond is judged to be absent, and in the cases of allophanate bond and urethane bond, when the proportions of protons present in the allophanate bond and the urethane bond are respectively 1% or more, the bonds are judged to be present and less than 1%, they are judged to be absent.

(Tg of the polyisocyanate composition)

Tg of the polyisocyanate composition is measured using a differential thermal analyzer (trade name: DSC6220 manufactured by Seiko Instruments Inc.) at a heating rate of 20° C./min.

(Tg of coating film)

A coating film of 20 μm in thickness formed by curing the coating composition at 140° C. for 30 minutes is heated at a heating rate of 4° C./min, and a logarithmic decrement is measured using a rigid-body pendulum type viscoelasticity measuring device (RPT-3000W manufactured by A & D Co., Ltd.). The peak top of the logarithmic decrement is Tg of the coating film.

(Gel fraction)

About 0.2 g of a coating film formed by curing the coating composition at 80° C. for 30 minutes is dipped in about 40 g of acetone at 20° C. for 24 hours, and, thereafter, the proportion of mass of the undissolved portion to mass of the film before dipping is calculated. When it is less than 90%, the gel fraction is indicated by "X" and when it is 90% or more, the gel fraction is indicated by "o".

(Hardness of coating film)

Hardness of a coating film of 40 μm in thickness formed by curing the coating composition at 80° C. for 30 minutes is measured using Konig's hardness tester (Pendulum hardness tester manufactured by BYK Gardner Co., Ltd.) at 20° C. (unit: the number of times).

(Gauze drying property)

The coating composition is coated at a film thickness of 40 μm on a glass plate, then baked at 60° C. for 30 minutes, and thereafter left to stand at 20° C. for 1 hour. Five pieces of gauzes prescribed in the Japanese Pharmacopocia are put in layers on the coating film, and thereon is placed a weight of 100 g for 60 seconds. Thereafter, the weight and the gauzes are removed, and the mark of the gauzes left on the coating film is observed. The results are shown by the five grades of 1 (the mark being clearly seen)-5 (no mark being left), and furthermore the middles between the grades are shown by 0.5 unit.

EXAMPLE 1

In a four-necked flask equipped with a stirrer, a thermometer, a reflux condenser pipe, a nitrogen blowing pipe, and a dropping funnel and having nitrogen atmosphere therein were charged 560 parts of HDI, 240 parts of IPDI and 20 parts of trimethylolpropane (molecular weight: 134) as a trihydric alcohol, and the temperature in the reaction vessel was kept at 90° C. for 1 hour with stirring to carry out urethanation reaction. Thereafter, the temperature in the reaction vessel was kept at 80° C., and 0.096 part of tetramethylammonium capriate was added as an isocyanuration catalyst. The refractive index of the reaction mixture was measured, and when the yield reached 43%, phosphoric acid was added to terminate the reaction. The reaction mixture was filtered, and then unreacted HDI and IPDI were removed using a thin film evaporator. The viscosity at 25° C. of the resulting polyisocyanate in an amount of 353 g was 165,000 mPa·s, the concentration of isocyanate group was 19.2 mass %, the concentration of diisocyanate monomer was 0.3 mass %, the number average molecular weight was 1050, the average number of isocyanate group was 4.8, Tg was −32° C., and the mass ratio of HDI component/IPDI component was 78/22. Presence of allophanate group and isocyanurate group was confirmed, while presence of urethane bond could not be confirmed.

Compositions of the charged starting materials, reaction conditions, and physical properties of the prepared polyisocyanate composition are shown in Table 1.

EXAMPLES 2-5

Example 1 was repeated, except that the compositions of the charged starting materials and the reaction conditions were changed as shown in Table 1. The compositions of the charged starting materials, the reaction conditions, and the physical properties of the prepared polyisocyanate compositions are shown in Table 1.

EXAMPLES 6-10

An acrylic polyol (trade name: SETALUX 1767 manufactured by Akzonobel Co., Ltd., concentration of resin component: 65%, hydroxyl value: 150 mgKOH/g-resin) and each of the polyisocyanate compositions obtained in Examples 1-5 were blended at an equivalent ratio of isocynate group/hydroxyl group of 1.0. Viscosity of the coating compositions was suitably adjusted with an organic solvent, and the coating compositions were evaluated on their physical properties. The curing agents used and the physical properties of the coating film are shown in Table 2.

COMPARATIVE EXAMPLES 1-3

Example 1 was repeated, except that the compositions of the charged starting materials and the reaction conditions were changed as shown in Table 1. The compositions of the charged starting materials, the reaction conditions, and the physical properties of the resulting polyisocyanate compositions are shown in Table 1.

COMPARATIVE EXAMPLE 4

Example 1 was repeated, except that 240 parts of HDI, 560 parts of IPDI and 60 parts of P303 were used and the yield was 45%. The resulting polyisocyanate composition was cloudy, and hence the evaluation of physical properties was discontinued.

COMPARATIVE EXAMPLES 5-9

Example 6 was repeated, except that the curing agents shown in Table 2 were used. The curing agents used and the physical properties of the coating film are shown in Table 2.

TABLE 1

|  | Charged starting materials | | | | Reaction conditions | | | Physical properties of polyisocyanate | |
|---|---|---|---|---|---|---|---|---|---|
|  | HDI (part by mass) | IPDI (part by mass) | alcohol (part by mass) | NCO/OH (equivalent ratio) | Temperature (°C.) | Time (Hr) | HDI/IPDI | Number of NCO functional group | Mn |
| Example 1 | 560 | 240 | TMP 20 | 20 | 90 / 80 | 1 / 2 | 78/22 | 4.8 | 1050 |
| 2 | 480 | 320 | TMP 25 | 15 | 90 / 80 | 1 / 3 | 70/30 | 5.5 | 1250 |
| 3 | 540 | 240 | TMP 20 | 10 | 90 / 80 | 1 / 3 | 79/21 | 6.5 | 1510 |
| 4 | 640 | 160 | TMP 27 | 15 | 90 / 80 | 1 / 3 | 84/14 | 5.4 | 1190 |
| 5 | 480 | 320 | P303 60 | 14 | 90 / 80 | 1 / 3 | 71/29 | 5.1 | 1350 |
| Comparative Example 1 | 700 | 300 | no | — | 80 | 2 | 70/30 | 3.3 | 660 |
| 2 | 1000 | No | P303 100 | 12 | 90 / 80 | 1 / 3 | 100/0 | 7.6 | 1820 |
| 3 | 600 | No | TMP 20 | 16 | 90 / 80 | 1 / 3 | 100/0 | 5.1 | 1080 |

|  | Physical properties of polyisocyanate | | | | | | | | |
|---|---|---|---|---|---|---|---|---|---|
|  | [NCO] (mass %) | Viscosity (mPa·s/ 25°C.) | Yield (mass %) | DI (mass %) | Concentration of polyol component (mass %) | A bond | I bond | U bond | Tg (°C.) |
| Example 1 | 19.2 | 165,000 | 43 | 0.3 | 5 | Present | Present | Absent | −32 |
| 2 | 18.3 | 965,000 | 44 | 0.3 | 7 | Present | Present | Absent | −24 |
| 3 | 18.0 | 1,220,000 | 48 | 0.3 | 9 | Present | Present | Absent | −34 |
| 4 | 19.2 | 115,000 | 44 | 0.3 | 7 | Present | Present | Absent | −40 |
| 5 | 15.8 | 220,000 | 42 | 0.3 | 16 | Present | Present | Absent | −25 |
| Comparative Example 1 | 21.0 | 16.500 | 37 | 0.3 | 0 | Absent | Present | Absent | −40 |
| 2 | 17.5 | 31,000 | 63 | 0.3 | 14 | Present | Present | Absent | −55 |
| 3 | 19.9 | 25,000 | 48 | 0.2 | 7 | Present | Present | Absent | −53 |

P303: Polyester polyol ("PLACCEL 303" of Daicel Ltd., molecular weight 300, triol)
TMP: Trimethylolpropane;
HDI/IPDI: Mass ratio of HDI component to IPDI component constituting polyisocyanate (composition);
Number of NCO functional group: Average number of isocyanate group (in one molecule of polyisocyanate);
Mn: Number average molecular weight;
[NCO]: Concentration of isocyanate group;
DI: Diisocyanate monomer;
A bond: Allophanate bond; I bond: Isocyanurate bond; U bond: Urethane bond

TABLE 2

|  | Curing agent | Evaluation of coating film | | | |
|---|---|---|---|---|---|
|  |  | Gel fraction | Hardness of coating film (time) | Gauze drying property | Tg (°C.) |
| Example 6 | Example 1 | ○ | 90 | 5 | 85 |
| 7 | Example 2 | ○ | 95 | 5 | 92 |
| 8 | Example 3 | ○ | 90 | 5 | 89 |
| 9 | Example 4 | ○ | 80 | 4 | 79 |
| 10 | Example 5 | ○ | 95 | 5 | 91 |
| Comparative Example 5 | Comparative Example 1 | X | 95 | 3.5 | 83 |
| 6 | Comparative Example 2 | ○ | 70 | 3 | 70 |
| 7 | Comparative Example 3 | ○ | 70 | 3 | 71 |

TABLE 2-continued

|  | Curing agent | Evaluation of coating film | | | |
|---|---|---|---|---|---|
|  |  | Gel fraction | Hardness of coating film (time) | Gauze drying property | Tg (° C.) |
| 8 | TPA (Tg = −69° C.) | X | 65 | 3 | 68 |
| 9 | TPA/T-1890 = 8/2 (mass ratio) (Tg = −46° C.) | X | 90 | 3.5 | 79 |

TPA: Trade name of HDI isocyanurate type polyisocyanate of Asahi Kasei Chemicals Co. Average number of isocyanate group: 3.2 (in one molecule of polyisocyanate)
T1890: Trade name of IPDI isocyanurate type polyisocyanate of Degussa Inc. Average number of isocyanate group: 3.1 (in one molecule of polyisocyanate)

INDUSTRIAL APPLICABILITY

According to the urethane-based coating compositions containing the (block) polyisocyanate composition of the present invention, there can be attained all of weatherability, high curability, drying characteristic and coating film hardness. Therefore, the coating compositions are useful in the wide variety of the fields of precoated metals including anticorrosive steel plates, automobile finishing, etc. as primers or facing or intercoating agents for metals such as steel plates and surface-treated steel plates, plastics and inorganic materials. Furthermore, the coating compositions are useful also as clear coatings containing no pigment which are excellent in acid rain resistance and weatherability. Furthermore, the coating compositions can be coated on non-aqueous or aqueous base coat containing pigments.

The invention claimed is:

1. A polyisocyanate composition which is represented by the following structural formula (I) and satisfies all of the following requirements: i) the diisocyanate monomer concentration in the polyisocyanate composition is not more than 3 mass %, ii) the polyol component concentration in the polyisocyanate composition is 3-30 mass %, and iii) the glass transition temperature is −50° C. to 0° C.;

$$R\text{—}(NCO)_n \quad (I)$$

(in the formula, R is a residue excluding isocyanate group in the polyisocyanate composition derived from hexamethylene diisocyanate, isophorone diisocyanate and a polyol selected from the group consisting of trimethylolpropane and the diisocyanate and the polyol are bonded through an allophanate bond in at least a part of bonding portions of the diisocyanate and the polyol, the ratio of aliphatic diisocyanate component/alicyclic diisocyanate component is 95/5-50/50 (by mass ratio), and n (a statistical average number of isocyanate group in one molecule of the polyisocyanate) is 4.5-20).

2. The polyisocyanate composition according to claim 1 which has a viscosity of 100,000-2,000,000 mPa·s/25° C.

3. The polyisocyanate composition according to claim 1, wherein the glass transition temperature is −45° C. to −10° C.

4. The polyisocyanate composition according to claim 1, which contains an isocyanurate bond.

5. A block polyisocyanate composition comprising the polyisocyanate composition according to claim 1, in which a part or the whole of the isocyanate group is blocked with a blocking agent.

6. A method for producing the polyisocyanate composition according to any one of claim 1, 2, 3 or 4, which comprises the steps of: reacting hexamethylene diisocyanate, isophorone diisocyanate and trimethylolpropane at a ratio of isocyanate group/hydroxyl group (equivalent ratio)=3/1-30/1; optionally carrying out isocyanuration reaction after or simultaneously with the above reaction; and then removing unreacted diisocyanate monomers.

7. A coating composition which comprises the polyisocyanate composition according to claim 1 or the block polyisocyanate composition according to claim 7, and at least one polyol.

8. The coating composition according to claim 7, which is used for clear coat.

9. A method for applying the coating composition according to claim 8, which comprises applying the coating composition to a base coat containing a pigment.

10. The application method according to claim 9, wherein the base coat is a water-based paint.

11. The application method according to claim 9 or 10, which further comprises simultaneously curing the base coat and the clear coat.

* * * * *